(12) United States Patent
Vanthoor (10) Patent No.: US 11,607,074 B2
(45) Date of Patent: Mar. 21, 2023

(54) COOKING ASSEMBLY, COOKING POT AND POT LID WITH VAPOUR PASSAGE (71) Applicant: BERGHOFF WORLDWIDE NV, Heusden-Zolder (BE)

(72) Inventor: Rafael Vanthoor, Heusden-Zolder (BE)

(73) Assignee: BERGHOFF WORLDWIDE NV, Heusden-Zolder (BE)

( * ) Notice: Subject to any disclaimer, the term of this patent is extended or adjusted under 35 U.S.C. 154(b) by 265 days.

(21) Appl. No.: 16/772,324

(22) PCT Filed: Dec. 17, 2018

(86) PCT No.: PCT/IB2018/060165
§ 371 (c)(1),
(2) Date: Jun. 12, 2020

(87) PCT Pub. No.: WO2019/116355
PCT Pub. Date: Jun. 20, 2019

(65) Prior Publication Data
US 2021/0068583 A1 Mar. 11, 2021

(30) Foreign Application Priority Data
Dec. 15, 2017 (BE) .................................. 2017/5949

(51) Int. Cl.
*A47J 36/38* (2006.01)
*A23L 5/10* (2016.01)
*A47J 36/06* (2006.01)

(52) U.S. Cl.
CPC ................. *A47J 36/38* (2013.01); *A23L 5/10* (2016.08); *A47J 36/06* (2013.01)

(58) Field of Classification Search
CPC ........... A47J 36/38; A47J 36/06; B65D 51/16; B65D 51/1605; B65D 51/1611; B65D 51/1622; B65D 47/32
See application file for complete search history.

(56) References Cited

U.S. PATENT DOCUMENTS

| 1,340,336 A | 5/1920 | Hankulich |
| 2,184,671 A | 12/1939 | Hollander |
| 5,279,279 A | 1/1994 | White |

(Continued)

FOREIGN PATENT DOCUMENTS

| AU | 515237 | 4/1980 |
| BE | 463850 A | 4/1946 |
| DE | 212009000092 U1 | 1/2012 |

(Continued)

OTHER PUBLICATIONS

ISR for PCT/IB2018/060165, dated Apr. 11, 2019.

*Primary Examiner* — Don M Anderson
(74) *Attorney, Agent, or Firm* — Hodgson Russ LLP (57) ABSTRACT

In a first aspect, the invention relates to an assembly (1) comprising a cooking pot (2) and a corresponding pot lid (3), for closing off the cooking pot, in which the assembly is provided with a vapour passage (14) for leading vapour out of the assembly. In particular, said vapour passage extends in the direction of the cooking pot. In further aspects, the invention relates to a method for downdraft extraction of vapour, and to a cooking pot (2) and a pot lid (3), which preferably are appropriate for use in said assembly.

7 Claims, 6 Drawing Sheets (56) References Cited

U.S. PATENT DOCUMENTS 6,202,638 B1 3/2001 Didio-Sayer
2004/0250690 A1* 12/2004 Restis .................... A47J 36/14
99/403

FOREIGN PATENT DOCUMENTS

EP 2430957 A1 3/2012
FR 1056045 A 2/1954
FR 2657002 A1 7/1991

* cited by examiner

COOKING ASSEMBLY, COOKING POT AND POT LID WITH VAPOUR PASSAGE

TECHNICAL FIELD

The present invention relates to methods and devices for improving vapour extraction, for removing cooking vapours. More in particular, the invention relates to methods and devices for supporting downdraft and/or sidedraft extraction systems.

BACKGROUND

When heating food products at a cooking unit, mostly, an upward vapour stream generally arises at the cooking unit. For extracting and removing such vapour streams, an extraction system with vapour passage is typically provided in the vicinity of the cooking unit.

At a predetermined flow rate, upward extraction systems (e.g. a classic cooker hood) perform the best. Thereby, the vapour exhaust is arranged above the cooking unit. However, significant disadvantages of such cooker hoods are their large size and their unattractive look. Moreover, they are an integral part of the fixed kitchen infrastructure. Between two cooking sessions, a classic cooker hood can thus not easily be stored.

Amongst other things considering the above-mentioned disadvantages, downdraft and sidedraft systems are becoming increasingly popular. The actual vapour extraction is thereby no longer provided above the cooking unit, but it can be integrated in the cooking unit itself, or it can be arranged along or behind the cooking unit.

However, often, such systems appear to be insufficiently powerful for extracting the inherent upward vapour streams sidewards/downwards. U.S. Pat. No. 5,279,279 A tries to offer a solution, by means of a deflector plate that is arranged above the cooking unit. The curved surface of the deflector plate deflects the vapour stream in the direction of the vapour exhaust.

However, just like a cooker hood, such a deflector plate is large and does not look attractive. Moreover, the deflector plate is an integral part of the fixed kitchen infrastructure, which is again not desirable. Also, it contributes only to a small extent to the downdraft/sidedraft extraction of vapour.

U.S. Pat. No. 6,202,638 B1 also describes a casing of a grill device, that grill device further comprising a ventilator, for downdraft extraction of fumes. The casing ensures that fumes and oil spatters do not go out freely. Moreover, a number of openings have been provided in the casing, arranged in such way that the fumes inside the casing can be extracted by means of the ventilator, outside the casing.

However, such a casing can only be used for protecting from and extracting fumes when grilling, and its application is only possible in combination with very specific types of grill devices.

The present invention now aims to find at least a solution for at least some of the above-mentioned problems or disadvantages.

SUMMARY

In a first aspect, the invention relates to an assembly. The assembly comprises a cooking pot and a corresponding pot lid, for closing off the cooking pot, in which the assembly is provided with a vapour passage for extracting vapour from the assembly. The assembly thus allows, in its closed configuration, to still release vapour from the pot volume. In particular, the vapour passage extends in the direction of the cooking pot.

The released vapour stream thus follows a path that at least partially extends in the direction of the cooking pot, i.e. with a downward moving component. Such an assembly contributes to vapour extraction by means of a downdraft and/or sidedraft extraction system. Optionally, the vapour stream is moreover discharged in a downward direction. The discharge of vapour in a downward direction appears to offer a more effective support than the downward deflection of an initially differently oriented vapour stream, for example by means of a deflector plate. Moreover, such an assembly can be easily stored, between two cooking sessions, as is usual the case for cooking pots and pot lids. Preferably, a part of the vapour passage is essentially parallel to the outer surface of the pot wall, in which the vapour stream can be led downwards along that surface. Such an assembly can be used combined with a lighter extraction system, with a lower flow rate.

In a specific embodiment, the vapour passage is constituted of one or more vapour passage channels. Preferably, the vapour passage channels extend to a niche of the assembly. More preferably, it relates to an overhung and/or covered niche. Downdraft and sidedraft extraction of vapour is much more effective when the vapour is enclosed by an overhung and/or covered niche. Indeed, the overhang and/or the cover thereby prevent that the vapour rises.

Optionally, the vapour passage channels extend at least partially downwardly. Optionally, the assembly comprises a overhang, in which the vapour passage is constituted by one or more vapour passage channels, extending through the overhang. Optionally, the assembly comprises a span, in which the vapour passage is constituted by one or more vapour passage channels, extending underneath and along the span, between the pot edge and a lid edge. Preferably, said niche is either overhung by said overhang, or spanned by said span. Preferably, the vapour passage channels are thereby oriented towards the part of the ambient volume, that is overhung/spanned. Preferably, the vapour passage channels thereby reach up to the part of the ambient volume, that is overhung/spanned. In this way, the assembly still further supports the operation of a downdraft extraction system.

In further aspects, the invention relates to a pot lid and to a cooking pot, which pot lid and which cooking pot are preferably appropriate for use as a pot lid and a cooking pot, respectively, in the assembly according to the first aspect of the invention. The same advantages can be repeated in this respect.

In another aspect, the invention relates to a method for downdraft extraction of vapour. Preferably, the method thereby uses the assembly according to the first aspect of the invention.

DETAILED DESCRIPTION

The invention relates to a cooking assembly, a cooking pot and a pot lid comprising vapour passages, and further also to a method for downdraft extraction of vapour.

Unless otherwise specified, all terms used in the description of the invention, including technical and scientific terms, shall have the meaning as they are generally understood by the worker in the technical field of the invention. For a better understanding of the description of the invention, the following terms are explained specifically.

"A", "an" and "the" refer in the document to both the singular and the plural form unless clearly understood differently in the context. "A segment" means for example one or more than one segment.

When "approximately" is used in the document together with a measurable quantity, a parameter, a period or moment, etc., variations of +/−20% or less, preferably +/−10% or less, more preferably +/−5% or less, still more preferably +/−1% or less, and even still more preferably +/−0.1% or less than and of the cited value are meant, as far as such variations apply to the invention that is described. It will however be clearly understood that the value of the quantity at which the term "approximately" is used, is itself specified.

The terms "include", "including", "consist", "consisting", "provide with", "contain", "containing", "comprise", "comprising" are synonyms and are inclusive of open terms that indicate the presence of what follows, and that do not exclude or prevent the presence of other components, characteristics, elements, members, steps, known from or described in the state of the art.

The terms "vapour(s)" and "cooking effluent(s)", as used throughout this document, are mutually exchangeable terms and should be interpreted broadly. They can amongst other things refer to any cooking effluent, selected from the group comprising water vapour, fat vapour, oil vapour and other vapours and gasses, steam, fumes, hot air, fine water drops, fat drops and/or oil drops in the gas/vapour phase, other spraying substances, powdered substances in the gas/vapour phase and any other mixture thereof. In a further or alternative definition, "vapour(s)" and "cooking effluent(s)" relate to any substantially gaseous mixture that is released when preparing/processing food products (or more in general in an operative state of the assembly), and for which it is desirable that they are extracted by means of vapour extraction. Such vapours can be released when heating food products, but the invention is by no means limited thereto.

The terms "vapour extraction" and "extraction system" are mutually exchangeable terms, and refer to systems for extracting vapours when preparing/processing food products (e.g. by heating them), thus comprising both updraft (e.g. the classic cooker hood), downdraft and sidedraft extraction systems. When desired, it will be further specified if it relates to an updraft, downdraft, or sidedraft extraction system. If not further specified, the term "downdraft extraction system" will moreover relate to extraction systems in a downward and/or sideward direction, analogous with the English terms "downdraft/downdraught systems".

Furthermore, the invention is by no means limited to either cooking or baking. "Cooking", as used throughout the document, should be interpreted as further comprising: cooking, baking, deep-frying, grilling, roasting, poaching, stir-frying, braising, steaming, stewing and any other technique for preparing a food product, in which vapours/cooking effluents could be released.

When referring to a "cooking pot", the latter term can moreover also be changed by a "frying pan", "deep frying pan", "casserole", "stir-frying pan", "steaming pot" and similar. Preferably, the cooking pot comprises a "pot bottom" and a "pot wall", which pot wall extends from the pot bottom in an upward direction up to an open circumferential edge of the cooking pot, also called the "pot edge". Said open circumferential edge thereby borders an upward-directed pot opening. Moreover, "edge" and "edge part" are used here as interchangeable terms. Preferably, the cooking pot is appropriate for being placed on a cooking unit comprising at least one hob (e.g. an electric hob, a gas hob or an induction hob), for heating the content of the cooking pot, from the pot bottom. In a possible embodiment, the pot bottom is essentially a circular disc, in which the pot wall essentially relates to a circular sheath, and in which the pot edge also essentially describes a circle. In another possible embodiment, the pot bottom is essentially an oval disc, in which the pot wall essentially relates to an oval sheath, and in which the pot edge also essentially describes an oval. Of course, the invention is not limited to circular/oval cooking pots; the skilled worker will be able to apply the invention on and/or combine it with a cooking pot of any design, known in the state of the art.

The terms "lid(s)" and "pot lid(s)", as used throughout this document, are mutually exchangeable terms. They refer to lids for closing off pot openings of cooking pots, as known in the state of the art. Typically, the pot lid thereby defines a lid edge that can be placed at least partially in, on or over the pot edge, in which the cooking pot and the corresponding pot lid can be brought into a closed configuration. In this closed configuration, the lid edge preferably rests onto the pot edge, and they define an (at least partially) closed "pot volume", extending inside the cooking pot and the pot lid. The pot volume is appropriate for comprising food when preparing it (e.g. by means of heating). Outside, a "ambient volume" extends.

"Food products" should be interpreted broadly, as possibly comprising any substance(s), appropriate for preparing (e.g. heating) it within a pot volume, and appropriate for consumption thereof after its preparation within a pot volume.

The term "vapour passage", as used throughout this document, refers in its largest extent to a path that can be followed by vapour. The presence of a vapour passage thus does not necessarily mean the presence of something that is material/tangible, but rather at least the existence of the possibility of a passage of vapour. A (tangible) object/element/body and similar, that "comprises a vapour passage", is however in such form that the vapour has the possibility to pass for example along or through that object. The corresponding vapour passage then refers to the path that is thereby followed by the vapour. Optionally, this vapour passage can also be determined by o.a. the vapour pressure, vapour pressure gradient and vapour temperature.

When "bending/deflecting the vapour passage", the vapour is forced into a bend; the followed path thereby comprises at least one bend.

"Radial" and "in radial direction", as used herein, refers to directions that are extending perpendicular to a central, vertical axis of the cooking assembly, in the horizontal plane. Opening angles in the horizontal plane, from the central axis, are referred to as "azimuthal aperture angles".

The citation of numeric intervals by means of end points includes all integers, fractions and/or real numbers between the end points, including these end points.

In a first aspect, the invention relates to an assembly comprising a cooking pot and a corresponding pot lid, for closing off the cooking pot, in which the assembly is provided with a vapour passage for extracting vapour from the assembly. The assembly thus allows, in its closed configuration, to still release vapour from the pot volume. In particular, the vapour passage extends in the direction of the cooking pot. Hereby, one assumes a closed configuration of the cooking pot and pot lid, in which the pot lid is placed onto the cooking pot. The vapour passage extends in the direction of the cooking pot, in that sense that the vapour stream has a downward moving component along at least a part of the followed path. Optionally, the vapour stream is discharged in a downward direction, from the pot volume, into the ambient volume. Such an assembly contributes to vapour extraction by means of a downdraft and/or sidedraft extraction system. Moreover, it appeared that the discharge of a vapour stream according to a downward direction, is much more effective than means for deflecting an originally upward directed vapour stream, into a downward of sideward direction, for example by means of a deflector plate. The vapour stream namely remains better converged, as a result of which it will better keep its direction. The invention is however by no means limited to the downward discharge of vapour, as described below. Moreover, such an assembly can be easily stored, between two cooking sessions, as is usual the case for cooking pots and pot lids.

Preferably, a part of the vapour passage is essentially parallel to the outer surface of the pot wall. The vapour stream can in this way easily be led downwards or sidewards, along (at least a part of) the wall structure of the cooking pot. This wall structure thus gets an additional function. Preferably, the vapour is thereby led in a downward direction, along a vertical standing and/or inclined part of the wall structure. For example, the wall stream is moved along the pot wall up to the vapour discharge exactly next to or around the hob, where the vapour is extracted.

Under the correct circumstances of temperature, pressure, pressure loss and flow rate, such a vapour stream is effectively extracted up to that outer surface, where it follows the shape of the outer surface (the so-called Coanda effect). Such a design for the vapour assembly thus does not only allow to already orient the apparently inherent upward vapour stream into a downward direction, but moreover to better keep the further, downward moving component of that vapour stream. The downdraft extraction system is thereby further supported.

Because the extraction system is supported, it can be chosen lighter, so that also the product and installation costs thereof will be lower. Alternatively, an extraction system is provided with two or more stands; in a first position with low extraction rate, one can only cook by means of the above-mentioned assembly, or at least in a configuration in which the downdraft extraction system is sufficiently supported. Furthermore, when one cooks by means of traditional assemblies, or in a cooking pot without a lid, the extraction system is switched to a second position with high extraction rate.

It is a known problem of sidedraft and/or downdraft extraction systems, that they are often insufficiently performant. Indeed, hot vapour has the tendency to rise, in homogeneous ambient air at room temperature (law of Archimedes). The extraction system should thus be more powerful than if it would be about a sidedraft extraction system: on the one hand, for deflecting and extracting a rising vapour stream, on the other hand, for effectively extracting that vapour stream. The present invention aims to solve this problem.

Moreover, an assembly with sufficiently large vapour passage(s) allow to cook freely in the environment (at atmospheric pressure), with the use of a closed pot lid. The vapour is then led along said vapour passage(s) in a downward direction out of the pot volume, while the post lid protects the user against splashing water, oil and similar. The heat is also kept much better in the cooking pot. In a traditional cooking assembly, one should thereto place the pot lid in an inclined (and often very unstable) way onto the pot edge. Moreover, the size of the vapour passage between lid edge and pot edge can thereby not be adjusted precisely, and the pot lid no longer offers a full protection against splashing water, oil and similar. According to the present invention, the extent to which the vapour can leave the assembly, is determined in a fixed way by the shape and size of the vapour passage.

According to a further or alternative embodiment, the vapour passage is constituted by one or more vapour passage channels. Optionally, said vapour passage channels extend according to a downward direction. Preferably, these vapour passage channels cut the wall structure of the assembly. This is stronger than a vapour passage channel that is arranged e.g. between the pot edge and lid edge. Alternatively or moreover, they can still be arranged in that wall structure, for example along the pot edge or lid edge. For example, vapour passage channels are thereby at least partially arranged in an edge part of the cooking pot and/or the pot lid.

The "wall structure" of the assembly comprises the pot wall of the cooking pot, as well as the lid structure of the pot lid, and essentially function as that part of the assembly that ensures an (at least partial) separation between the pot volume and the ambient volume. Said vapour passage channels preferably extend through the wall structure, and they thereby ensure a fluid connection between the pot volume and the ambient volume.

Preferably, the wall structure of the assembly comprises a horizontally extending and/or inclining wall part, as separation between a pot volume on top of it and a ambient volume underneath, which wall part is provided with one or more above-mentioned vapour passage channels, which vapour channel passages extend in a downward direction through that wall part. Such vapour passage channels create a vapour passage extending perpendicular to that wall part, in a downward direction. Alternatively, the vapour passage channels do not necessarily extend in a downward direction, but the assembly comprises means for deflecting the vapour passage in a downward (or sideward) direction, e.g. towards a vapour discharge. Such means can take the shape of a valve that is provided above the exit of the vapour passage channels.

In a possible embodiment, the vapour passage comprises only one vapour passage channel. In an alternative embodiment, each vapour passage comprises a plurality of vapour passage channels arranged according to a vapour passage zone.

Preferably, the vapour passage channels have a diameter of minimum 0.2 mm, and maximum 12 mm, more preferably more than 0.5 mm, more preferably less than 10 mm, more preferably less than 8 mm, more preferably less than 6 mm, more preferably more than 1 mm. It now appears that upward splashing water and oil gush much less through such relatively small openings towards the outside. Moreover, they can offer sufficient vapour passage, especially in case a plurality of such vapour passage channels is grouped into a vapour passage zone. Preferably, the vapour passage zone thereby has an ordered structure; for example, the channels are ordered according to a square, rectangular or hexagonal grid. Such a mesh offers more strength to the vapour passage zone, so that the flange wall can be made thinner, and/or so that flexible and/or less robust materials can be used. Another advantage of such relatively small vapour passage channels is that they can offer more resistance to vapour, as a result of which, in use, a substantial pressure drop arises, along the length of the vapour passage channel. In this way, vapour gushes with a substantial speed out of the channels, as a result of which the vapour stream can be better oriented in a downward direction, for further supporting the downdraft extraction system.

According to a further or alternative embodiment, the assembly comprises a overhang, in which the vapour passage channels essentially extend through the overhang. More specifically, the vapour passage channels thereby extend through the overhang wall of the overhang. In the broadest sense, the term "overhang", as used throughout the document, should be considered as a physical part of the assembly that, in the closed configuration of the assembly, hangs over a significant part of the ambient volume. That part of the ambient volume is also called the "overhung (portion of) ambient volume". For example, the size of the overhung portion of ambient volume corresponds to minimum 1% of the pot volume, more preferably minimum 2%, more preferably minimum 3%, more preferably minimum 4%.

Preferably, the vapour passage channels are oriented towards the overhung (portion of) ambient volume. Preferably, the vapour passage channels extend to the overhung (portion of) ambient volume.

Preferably, the overhang relates to a radial bulging or bulge of the wall structure of the assembly. This bulge encloses a bulging part of the pot volume, and is surrounded by ambient volume both above and underneath it. The overhang wall is thus still used as a separation between the pot volume and the ambient volume, and is part of the wall structure of the assembly. In a preferred embodiment, the bulging part of the pot volume is situated above the overhung part of the ambient volume, in which one or more downward vapour passage channels, through the overhung wall, ensure a downward fluid connection with the ambient volume.

In a further or alternative embodiment, the overhung wall comprises a horizontal and/or inclined wall part, which wall part is cut in a downward direction by one or more vapour passage channels. Such an inclined wall part, that is inclined towards the central axis of the assembly, would allow to have condensation flow downwards into the cooking pot, so that this condensation does not go out through the vapour passage channels. However, the invention is in no way limited to such embodiments.

Alternatively, the vapour passage channels extend between the pot edge and the lid edge. This allows an easier design. Optionally, the vapour passage channels are partially integrated in the lid edge part and/or pot edge part. According to a possible embodiment, the assembly comprises a span, in which the vapour passage channels extend under and along the span, between the pot edge and the lid edge. Such a span and overhang have similar advantages. In particular, it can be stipulated that the span "spans" a part of the ambient volume.

Said overhang or span can extend over an azimuthal aperture angle of 360°, thus along the complete circumference of the assembly. The overhang or span can thereby be provided with a plurality of equally spread vapour passage channels, possibly arranged according to a number of vapour passage zones, for collaboration with a downdraft extraction system that is integrated along the circumference of the hob, in the cooking unit. Alternatively, such an overhang or span comprises only one or some directional vapour passage channels, each comprising one or more vapour passage channels. Such a design is more appropriate for collaboration with an extraction system comprising only one or some vapour passages.

According to a preferred embodiment, the assembly comprises only one vapour passage zone, comprising one or some vapour passage channels, which vapour passage zone is provided in an overhang or under a span of the assembly. Preferably, said overhang or span extends over an azimuthal angle sector, with an opening angle of at most 120°, preferably less than 100°, preferably between 0° and 90°, more preferably less than 90°, more preferably less than 75°, more preferably less than 60°. Such a design allows for a more directional discharge of the vapour flow.

According to a further or alternative embodiment, the assembly further comprises means for deflecting the vapour passage. Such means allow a further deflection of the vapour passage in a particular direction, for example in the direction of the vapour discharge of the extraction system. In this way, they ensure an additional support of the extraction system. For example, but in no way limited thereto, the assembly comprises a (deflector) valve.

According to a further or alternative embodiment, the overhang or span is at least partially enclosed by the pot lid. According to a further embodiment, the overhang or span is fully enclosed by the pot lid, and the cooking pot is thereby a traditional round or oval cooking pot, with respect to which cooking pot, the pot lid radially bulges. This would allow to produce the cooking pot in a simple way by means of known processes.

According to an alternative, further embodiment, the overhang is enclosed by both the cooking pot and the pot lid. This allows for an easy cleaning of the assembly.

According to a further or alternative embodiment, the overhang is at least partially enclosed by the cooking pot. According to a further embodiment, the overhang is fully enclosed by the cooking pot. This would allow to use a traditional, round or oval pot lid as a pot lid, that can be produced by means of known processes.

According to a further or alternative embodiment, the assembly comprises a niche, which niche is overhung by means of said overhang, or is spanned by said span. In a closed configuration of the assembly, the niche thereby comprises a least a part of the overhung/spanned ambient volume, with the above-said advantages. The overhung/spanned ambient volume thereby not (only) results from a radially bulging part of the assembly. It is rather at least partially integrated in the assembly, as a result of which that cooking assembly can be stored easier.

The niche can take the form of a radial dent or indentation. The niche can thereby cover a particular, azimuthal aperture angle, preferably approximately the same opening angle as the one of the overhang or span above. However, alternatively, the niche covers the full circumference of 360° of the assembly. Preferably, the niche is provided in the wall structure of the cooking pot. The overhang can thereby be provided in the pot wall itself, above the niche. Alternatively, the overhang is provided in the pot lid, in which the niche or indentation at least partially extends upwards, up to the pot edge. In case of a span, such a span is preferably provided win the pot lid.

Suppose, from a plan view, the surfaces covered by the pot volume and by the overhung part of the ambient volume are measured, in a predetermined, horizontal section of the assembly. Thereby comparing a section through the overhang on the one hand, and a section under the overhang, for example through the niche (if present) on the other hand, the surface that is covered by the pot volume will decrease, in favour of the surface that is covered by the overhung part of the ambient volume: preferably minimum 1% smaller and maximum 50% smaller, preferably maximum 40% smaller, more preferably maximum 30% smaller, more preferably maximum 20% smaller, more preferably minimum 2% smaller, more preferably minimum 3% smaller, more preferably minimum 4% smaller and more preferably minimum 5% smaller.

According to a further or alternative embodiment, the overhang/span is provided in the pot lid and the niche is provided in the cooking pot, in which the pot lid comprises a further, closed overhang/span, provided at another position along the circumference of the pot lid, for example diametrically with respect to the above-said overhang/span. Preferably, the pot lid can thereby be positioned onto the cooking pot in two ways. In a first, closed configuration, the first overhang/span (with vapour passage channels) is situated above the niche, in which a vapour passage thus exists from the pot volume, extending up to the niche, with the above-mentioned advantages. In a second, closed configuration, the second, closed overhang/span is situated above the niche, and the latter vapour passage is at least not provided any more. This allows a better control of the vapour passage; more cooking techniques (e.g. free cooking, cooking under pressure and/or steaming) can thus be applied with one and the same cooking assembly.

According to a further or alternative embodiment, the assembly comprises two handles, which handles extend diametrically, and in which said vapour passage extends along a transverse direction, transverse to the diametrical direction of the handle. Optionally, two vapour passages have been provided, extending diametrically, in which the diametrical direction of the vapour passages is orthogonal to the diametrical direction of the handles. Such a design takes into account safety, in particular the risk of burning. Indeed, the handles are removed as far as possible from the vapour passage(s). However, optionally, the vapour passage is integrated in the handle.

The pot lid according to the present invention can comprise stainless steel, (cast) aluminium, glass, boron silicate, chinaware, silicone, and any other material, as well as combinations thereof, as known in the state of the art. The cooking pot according to the present invention can comprise stainless steel, (cast) aluminium, glass, boron silicate, chinaware, silicone, and any other material, as well as combinations thereof, as known in the state of the art. According to a possible embodiment, the pot lid closes by means of a rubber tightness at the cooking pot, in which e.g. the lid edge and/or pot edge comprise silicone. This ensures a good mutual connection, so that all vapour can escape via the vapour passage in a directed way.

According to a further or alternative embodiment, the pot lid is concave. Condensation will thereby flow at the inside of the pot lid towards the central axis; this, to avoid that too much condensation would go out of the pot volume along the vapour passage channels (at the edge of the pot lid).

In a second aspect, the invention relates a pot lid, that is appropriate for closing off a cooking pot. In particular, the pot lid thereby comprises a overhang or span. Preferably, it relates to an overhang or span as described above, with the above-mentioned advantages. Optionally, the pot lid can thereby be used in combination with a traditional, round/oval cooking pot.

According to a further or alternative embodiment, the pot lid is provided with one or more vapour passage channels, which vapour passage channels mainly extend through the overhang, or which vapour passage channels mainly extend under and along a span of the pot lid. Optionally, the vapour passage channels comprise radial grooves that have been made in an underside of the span. The same advantages as above can be repeated in this context.

In a possible embodiment, the vapour passage channels extend radially. In a possible embodiment, the vapour passage channels do not extend up to an outer side of a lid edge part. In a further embodiment, the vapour passage channels do not extend beyond a lid lip. The related advantages have been described with respect to the embodiment of FIG. 5.

According to a further or alternative embodiment, the pot lid is appropriate for use as a pot lid in the above-described assembly. Preferably, one or more characteristics of the pot lid of the assembly thereby also apply to the pot lid according to the second aspect of the invention.

In a third aspect, the invention relates to a cooking pot comprising a pot bottom and a pot wall, which cooking pot can be closed off by means of a pot lid.

Optionally, the pot wall comprises an overhang. Preferably, it relates to an overhang as described above, with the above-mentioned advantages. Optionally, the cooking pot can thereby be used in combination with a traditional, round/oval pot lid.

According to a further or alternative embodiment, the cooking pot is provided with one or more vapour passage channels, which vapour passage channels mainly extend through the overhang. The same advantages as above can be repeated in this context.

Preferably, the pot wall comprises a niche, appropriate for being overhung or spanned by an overhang or span as described above.

According to a further or alternative embodiment, the cooking pot is appropriate for use as a cooking pot in the above-described assembly. Preferably, one or more characteristics of the cooking pot of the assembly thereby also apply to the cooking pot according to the third aspect of the invention.

In a fourth aspect, the invention relates to a method for downdraft extraction of vapour, when preparing food products by means of heating inside an assembly, which assembly comprises a cooking pot and a pot lid, and which assembly is thereby provided with a vapour passage channel, for removing vapour from the assembly.

Optionally, the assembly further comprises an overhang, and the method comprises the step of removing vapour from the assembly, in which vapour is led through said overhang.

Preferably, the overhang is thereby provided with vapour passage channels, further preferably extending in a downward direction. Alternatively, the assembly comprises a span, in which vapour is led underneath the span.

Preferably, the assembly comprises a niche, in which vapour is led out of the assembly, up to or through the niche.

According to a further embodiment, the above-said assembly is appropriate for carrying out the method; the same advantages can be repeated in this respect, and characteristics/functions of the assembly can be translated into further or more specified steps in the present method in an obvious way.

In the following, the invention will be described by means of non-limiting examples and figures illustrating the invention, and not meant to be interpreted as limiting the scope of the invention.

FIGS. 1A-D are schematic cross-sections of cooking assemblies 1 according to embodiments of the present invention. Each assembly 1 comprises a cooking pot 2 and a corresponding pot lid 3. The cooking pot 2 comprises a flat, horizontal pot bottom 4, and further also a standing pot wall 5. The latter pot wall 5 is a mainly cylindrical structure extending in an upward direction of the pot bottom 4, and thereby leading to a pot edge 6. Thus, the cooking pot 2 defines a container for enclosing food 7, e.g. heating it, in which the pot bottom is placed on a hob of a cooking unit 8 (not shown in the present figures). In any case, the cooking pot 2 comprises an upwardly directed pot opening, which pot opening is bordered by a pot edge 6. Along this opening, the food 7 can be brought into and out of the cooking pot 2 (or, the pot volume 10). The pot opening can further be closed off by means of the pot lid 3; thereto, the pot lid 3 comprises a downwardly directed lid edge 9, that is resting onto the pot edge 6. The cooking assembly 1 is thereby in a closed configuration. In this closed configuration, a pot volume 10 can be defined, which pot volume 10 extends inside the assembly 1, and is at least partially closed off from an ambient volume 11, which surround volume 11 extends outside the assembly 1. Optionally, said lid edge 8 comprises a downwardly directed lid lip 11, or other structure (e.g. a circumferential fold in the lid edge), for avoiding lateral movement of the pot lid 3 with respect to the cooking pot 2, in the closed configuration of the assembly 1.

According to a non-limiting example, the pot bottom 4 at least partially corresponds to a circular disc, in which the pot wall 5 at least partially relates to a cylindrical sheath, and in which also the pot edge 6 at least partially describes a circle. Thus, the cooking pot 2 defines an at least partially circular pot opening, of which the radius preferably corresponds to the standardized values, i.e. about 16 cm, about 18 cm, about 20 cm, about 22 cm, about 24 cm, about 26 cm or about 28 cm. However, the invention is in no way limited to such cooking pots 2.

In FIGS. 1A-D, the assembly 1 is each time in an operative state of the closed configuration; i.e. inside the pot volume 10, a vapour 13 is generated, for example by heating food 7. The assembly 1 is thereby also provided with a vapour passage 14, for removing vapour 13 out of the assembly 1. Said vapour passage 14 thereby ensures a fluid connection between the pot volume 10 and the ambient volume 11. Said vapour passage 14 each time extends in a downward direction, when leaving the pot volume 10. Consequently, the operation of a downdraft extraction system is thereby supported, for example because the vapour 13 is discharged from the pot volume 10 in the direction of a downward vapour discharge 15 (not shown in the present figures). Furthermore, after leaving the pot volume 10, the vapour passage 14 extends in the direction of the cooking pot 2, namely in the direction of the pot wall 5. Under the correct circumstances of pressure, temperature and flow rate, the vapour flow will thereby adhere to the surface of the pot wall 5, under the influence of the so-called Coanda-effect. This ensures a further support of the downdraft extraction of vapour 13.

Each time, the assembly 1 further also comprises an overhang 16. This overhang 16 comprises an overhang wall 17, which overhang wall 17 is preferably enclosed by the pot wall 5 and/or by the lid structure 18, depending on the fact if the overhang 16 itself is enclosed by the cooking pot 2, or by the pot lid 3. In any case, the overhang wall 17 extends between the pot volume 10 and the ambient volume 11, and thereby is part of the separation between both, in the closed configuration of the assembly 1. In any of the embodiments, said overhang 16 overhangs a part of the ambient volume 11, which part is indicated as the "overhung ambient volume" 20. Thereby, the overhang wall 17 comprises at least a lying or inclined wall part, above which a part of the pot volume 10 extends, and under which a part of the ambient volume 11 extends; the latter part of the ambient volume 11 is thereby the overhung ambient volume 20. Said vapour passage 14 is formed by a number of vapour passage channels 19, extending according to a downward direction through the overhang wall 17. They thereby ensure a downward fluid connection, of the pot volume 10, towards the ambient volume 11, and through the overhang wall 17. In particular, the vapour passage channels 19 thereby extend in the direction of the overhung ambient volume 20, and moreover reach up to that overhung ambient volume 20. The vapour passage 14 passes at least through that overhung ambient volume 20. The advantage of such a design is that the vapour flow is discharged in a downward direction out of the pot volume 10, for supporting a downdraft extraction.

Figure 1A:
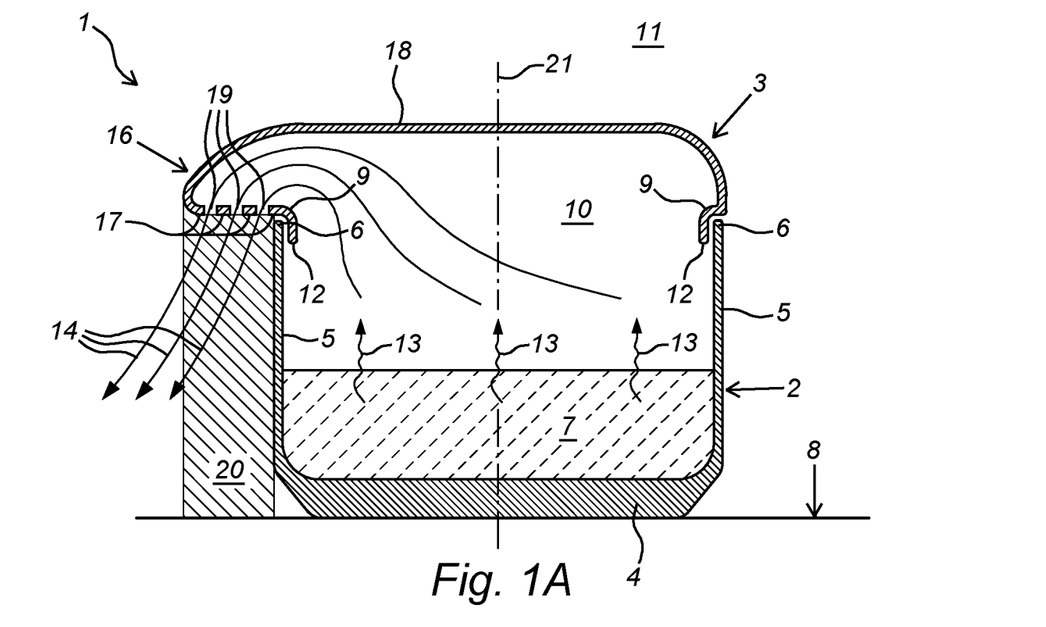
FIGS. 1A-D are schematic cross-sections of cooking assemblies according to embodiments of the present invention, in an operative state.

The specific embodiment according to FIG. 1A shows an assembly 1 according to the first aspect of the invention, comprising a pot lid 3 according to the second aspect of the invention. The overhang 16 is thereby formed by the pot lid 3, in which said collared wall 17 is enclosed by the lid structure 18. FIG. 1A further shows the central axis 21 of the assembly 1, that is oriented vertically. Preferably, the shown cooking pot 2 is a traditional, circular cooking pot 2. Thereby, the cooking pot 2 is mainly (thus with the exception of optional additional parts such as a pouring mouth, overpressure valves, handles and similar) described by a solid of revolution, around the central axis 21. As is clear from the figure, the pot lid 3, on the other hand, substantially deviates by shapes described by solids of revolution. In particular, the pot lid 3 comprises an overhang 16, which takes the form of a radially bulging part of the wall structure 18 of the pot lid 3. The use of a pot lid 3 according to the present invention thereby allows to use such traditional cooking pots 2 in combination with downdraft extraction systems. The operation of these extraction systems is indeed boosted, because vapour 13 is discharged in a downward direction, along the overhang 16. The invention is extended in an obvious way to other (traditional) forms of cooking pots 2. Preferably, such bulging/bulge/overhang 16 is provided only along one or more separate, azimuthal sectors of the pot lid. Preferably, the overhang 16 is provided only along one such sector, with an azimuthal aperture angle of at most 120°, preferably at most 90°, preferably between 0° and 90°. Such a local overhang 16 and corresponding vapour passage 14 can then be directed in a simple way towards the vapour discharge 15 of a downdraft extraction system.

In an alternative embodiment, such an overhang extends over 360°, along the full circumference of the pot lid 3, for cooperation with a downdraft extraction system that is integrated along the edge of hobs. In this way, the pot lid 3 still mainly takes the form of a solid of revolution, along the central axis 21. A similar alternative can be found in an obvious way, for each of the embodiments of FIGS. 1A-D.

Figure 1B:
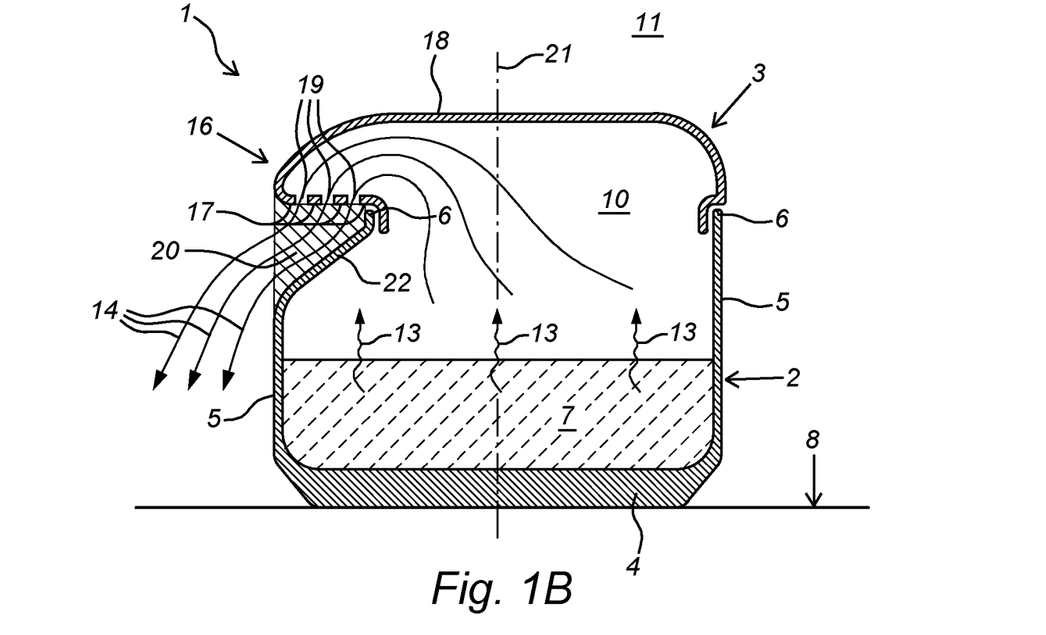

The specific embodiment according to FIG. 18 shows another assembly 1 according to the first aspect of the invention, comprising a pot lid 3 according to the second aspect of the invention. The overhang 16 is thereby formed by the pot lid 3 itself, in which said overhung wall 17 is enclosed by the wall structure 18 of the pot lid 3 (i.e. by the lid structure 18). Again, the shape of the pot lid 3 substantially deviates for that of a solid of revolution, along the central axis 21. Just like in FIG. 1A, the overhang 16 forms a radially bulging part with respect to the lid edge 9, away from the central axis 21. However, the cooking pot 2 too cannot be identified with such a solid of revolution; indeed, the cooking pot 2 is provided with a radial niche 22, which niche 22 is accessible from the ambient volume 11 of the assembly 1, and extends towards the central axis 21. The niche 22 itself is thereby shaped as a radial deformation of the wall structure of the cooking pot 2, towards the central axis 21. Preferably, this niche 22 extends over approximately the same azimuthal sector as the overhang 16. In an upward direction, the niche 22 extends up to the pot edge 6, in which this pot edge is thus also deformed towards the inside. Moreover, the niche 22 is overhung by said overhang 16, in which the overhung ambient volume 11 extends inside the niche 22. Vapour 13 is discharged in a downward direction through the vapour passage channels 19, and is led along the niche 22, for boosting the downdraft extraction system.

Figure 1C:
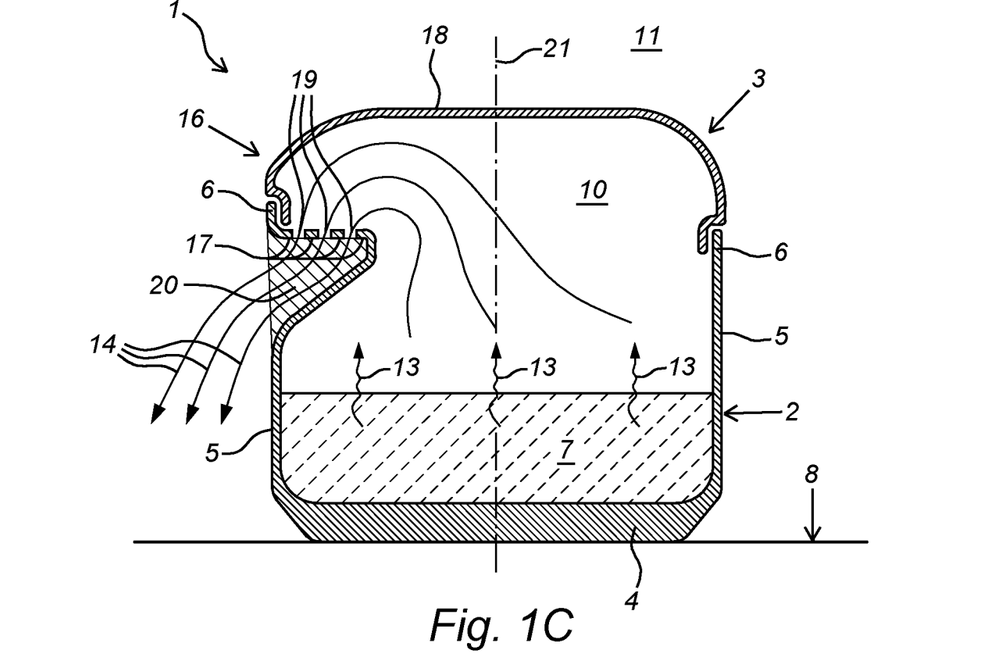

The specific embodiment according to FIG. 1C also shows an assembly 1 according to the first aspect of the invention, comprising a cooking pot 2 according to the third aspect of the invention. In particular, the cooking pot 2 comprises a radial niche 22 that is accessible from the ambient volume 11, and that is deformed by the wall structure 5 of the cooking pot 2 towards the inside. In an upward direction, this niche 22 is also overhung by means of the same pot wall 5, so that the cooking pot 2 preferably still ends in a (traditionally) circular, oval or otherwise shaped pot edge 6, and is thus appropriate for collaboration with an existing pot lid 3. Vapour 13 is discharged in a downward direction through the vapour passage channels 19, and is led along the niche 22, for boosting the downdraft extraction system. Basically, the overhang (i.e. in the broadest sense, the overhanging, radial bulging in the wall structure of the assembly 1) is formed together with the cooking pot 2 and the pot lid 3.

An additional advantage of the embodiments of FIGS. 1B and 1C is that the assembly 1 as a whole does not comprise a locally bulging part, by providing a niche.

As a result, it can be stored much more easily, in storing systems such as those provided for traditional cooking utensils.

Figure 1D:
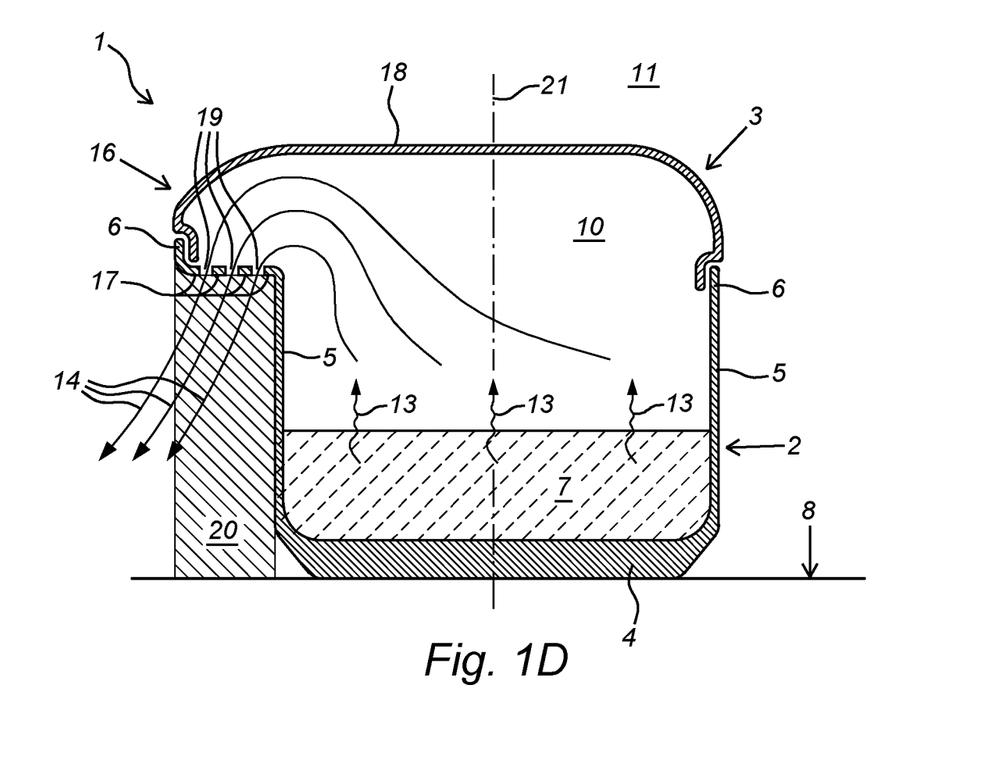

The specific embodiment according to FIG. 1D shows an assembly 1 according to the first aspect of the invention, comprising a cooking pot 2 according to the third aspect of the invention. Thereby, the wall structure 5 of the cooking pot 2 comprises a radial bulging, that overhangs a part of the ambient volume 20, that thereby constitutes an overhang wall 17, and that is provided with downward vapour passage channels 19. In an upward direction, this deformation continues (at least partially) up to the pot edge 6. The assembly 1 comprises a specially designed pot lid 3 with a comparable, radial bulging, at the level of the same azimuthal sector, for mutual connection of the cooking pot 2 and the pot lid 3. There, the wall structure 5, 18 of the cooking pot 2 and the pot lid 3 together constitute an overhang 16. Again, vapour 13 is discharged in a downward direction along the overhang 16. This design, in which the overhang 16 is partially enclosed by the pot lid 3, and partially by the cooking pot 2, allows for an easier cleaning of the bulging pot volume (i.e. the pot volume 10 that is enclosed by the overhang wall 17), in an open configuration of the assembly 1.

Figure 2A:
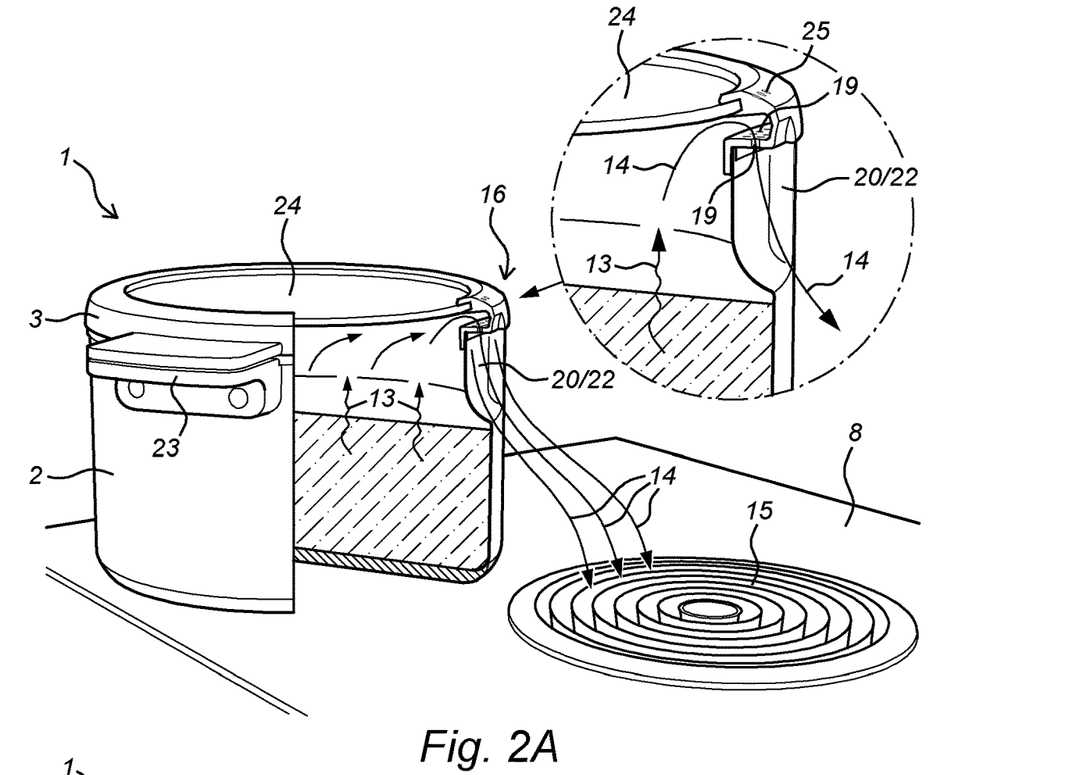
FIG. 2A shows a partially cut-away perspective view of an assembly according to 35 an embodiment of the present invention, arranged on a cooking unit with vapour passage. Moreover, the figure shows a detail of a vapour passage of the assembly.
Figure 2B:
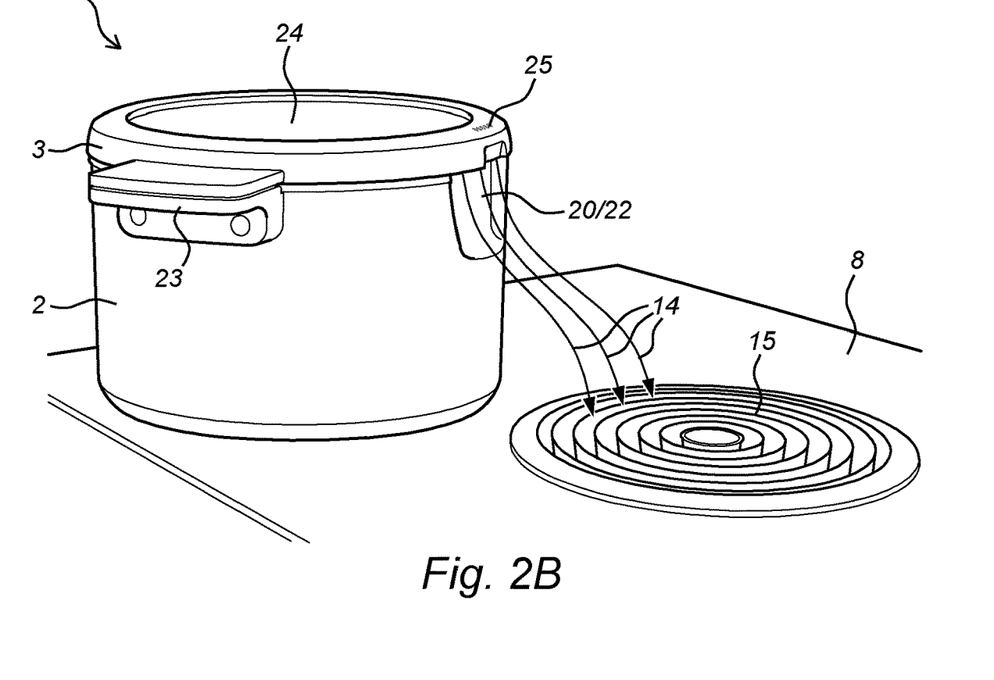
FIG. 2B shows a perspective view of an assembly according to the embodiment of FIG. 2A.

FIG. 2A shows a partially cut-away perspective view of an assembly 1 according to an embodiment of the present invention, comprising a cooking pot 2 and a pot lid 3, arranged on a cooking unit 8 with vapour passage 15. A perspective view is shown in FIG. 2B. Possibly, it relates in both cases to an assembly 1 according to the embodiment of FIG. 1B, but that is not necessarily the case.

The figure also shows that the pot lid 3 comprises an overhang 16, which that overhangs a niche 22 in the cooking pot 2. Vapour 13 can be removed along a vapour passage 14 out of the pot volume 10 towards the vapour discharge 15. In particular, this vapour passage 14 leads through vapour passage channels 19 in the overhang 16, up to the overhung ambient volume 20 extending inside the niche 22. The assembly 1 is furthermore also provided with handles 23. The lid comprises a cover plate 24 (e.g. a concave glass plate). In this way, condensation flows towards the central axis of the assembly, and not necessarily to its circumference. In this way, it can be avoided that too much condensation would go out of the pot volume 10 through the vapour passage channels 19.

FIG. 2A furthermore shows a detail of the vapour passage 14 of the assembly 1. As is shown in the figure, the overhang wall 17 is provided with a plurality of vapour passage channels 19, that are arranged in a grid. The pot lid 3 is furthermore also provided with a marking 25 along the upper side. This marking 25 indicates where the vapour passage 14 is situated, along the circumference of the assembly 1. In this way, the risk of burning is reduced.

Figure 3:
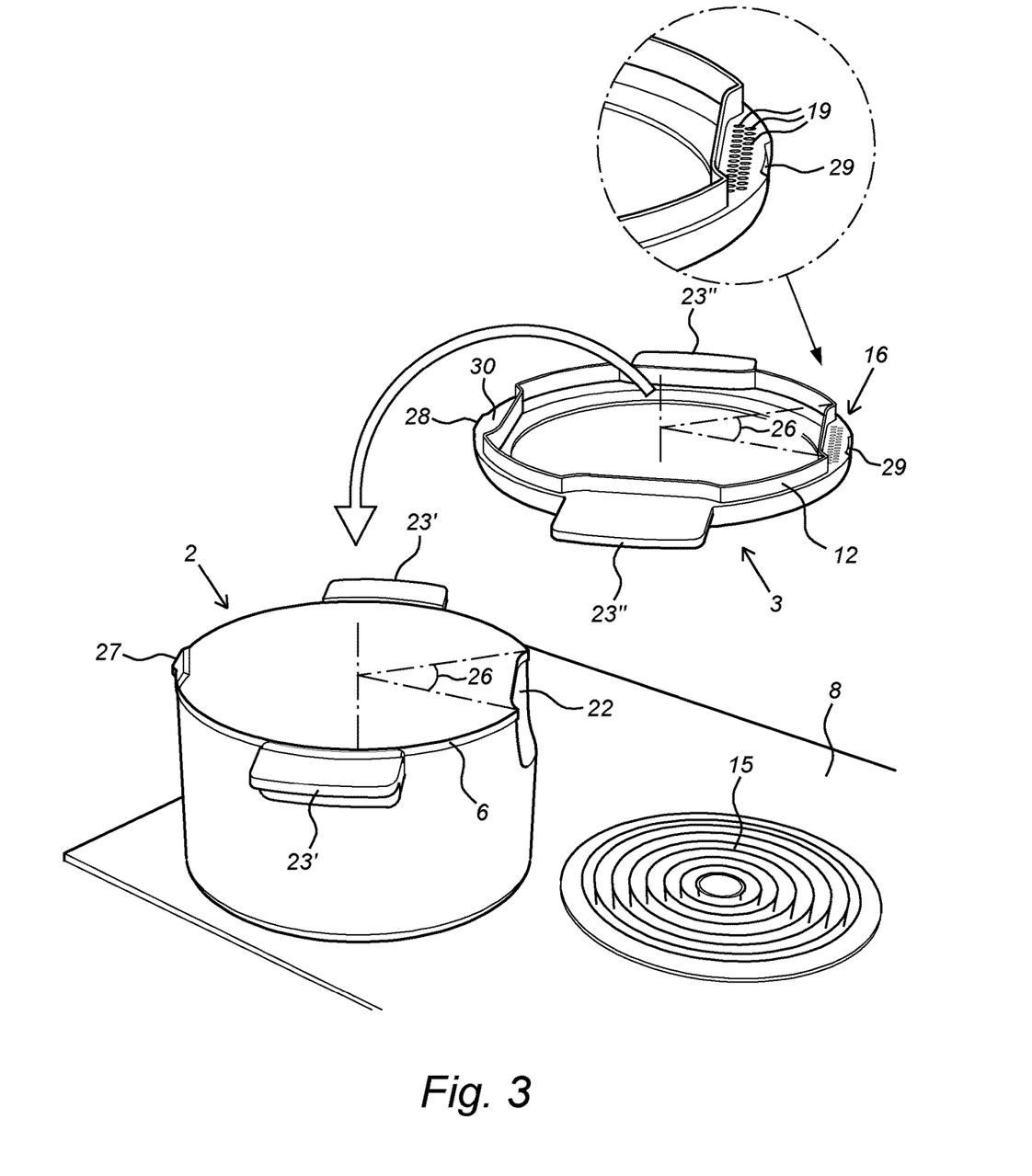
FIG. 3 shows a perspective view of an assembly comprising a cooking pot and a pot lid, according to an embodiment of the present invention. Moreover, the figure comprises a detailed illustration of a plurality of vapour passage channels, enclosed by the pot lid.

FIG. 3 shows a perspective view of an assembly 1 comprising a cooking pot 2 and a pot lid 3, according to an embodiment of the present invention. For example, it relates to a further embodiment of the embodiment according to FIGS. 2A-B. The assembly 1 is now in an open configuration, thus with the pot lid 3 taken from the booking pot 2. The cooking pot 2 is thereby positioned on a cooking unit 8 with built-in downdraft extraction system 15.

In particular, the pot lid again comprises an overhang 16, with an overhang wall 17 that is cut by a plurality of vapour passage channels 19. This is shown in more detail in the figure. The pot wall 5, on the other hand, forms a niche 22 that extends in an upward direction up to the pot edge 6. The niche 22, as well as said overhang 16, describe an azimuthal aperture angle 26 of approximately 50°. Thereby, the niche 22 is configured for being overhung by the overhang. Moreover, the figure shows a detailed view of a plurality of vapour passage channels, enclosed by the pot lid.

Now, the pot lid 3 can be turned upside down, and be placed, in this way, onto the cooking pot 2. The assembly 1 is thereby brought into a closed/operative configuration; this action is indicated by a curved arrow. The lid edge 9 now comprises a lid lip 12, that is formed in such way that only a discrete number of mutual positions of the pot lid 3 onto the cooking pot 2 are possible. For only two positions, the handles 23′, 23″ of the cooking pot 2 and the pot lid 3 fit in with each other; only these closed configurations are considered:

In the first closed configuration, the right part of the pot lid 3 is placed onto the right part of the cooking pot 2. Thereby, the pouring mouth 27, provided along the cooking pot edge 6, is closed off by means of the pouring stop 28 provided thereto at the lid edge 9. The pouring of the cooking fluid along the pouring mouth 27 is in this way avoided. On the other hand, said vapour passage channels 19 offer a way out for the vapour 13, out of the pot volume 10.

In the second closed configuration, the right part of the pot lid 3 is placed onto the left part of the cooking pot 2. Thereby the pouring mouth 27 is lying free, as a result of the recess 29 that is provided thereto in the pot lid 3. This allows pouring of e.g. the cooking fluid. This time, however, the niche 22 is overhung by means of a closed overhang, so that said vapour passage channels 19 remain unused as a passage for vapour. This configuration allows cooking in a better closed-off pot volume 10, e.g. for better keeping it warm.

Thereby, the second, closed-off overhang 30 is positioned diametrically with respect to the first overhang 16. Such a design thus provides two or more closed configuration for the assembly 1.

Figure 4A:
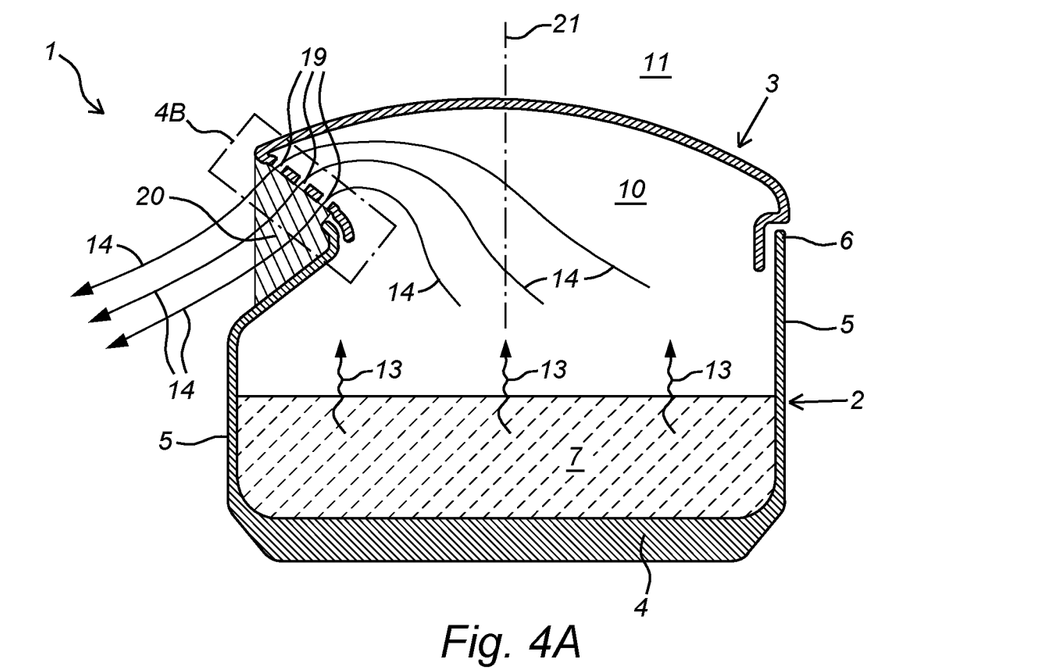
FIG. 4A is a schematic cross-section of a cooking assembly according to an embodiment of the present invention, in an operative status of the assembly.

FIG. 4A is a schematic cross-section of a cooking assembly 1 according to a possible embodiment of the present invention, in an operative status of the assembly 1. It relates to an embodiment that is very similar to the embodiment of FIG. 1B.

An important difference is however that the overhang wall 17 is not necessarily extending horizontally/lying, but is inclined towards the central axis 21. As a result, possible condensation 31 will not accumulate above this overhang wall 17, which would enhance seeping of the condensation 31, through the vapour passage channels 19.

Figures 4B, 4C:
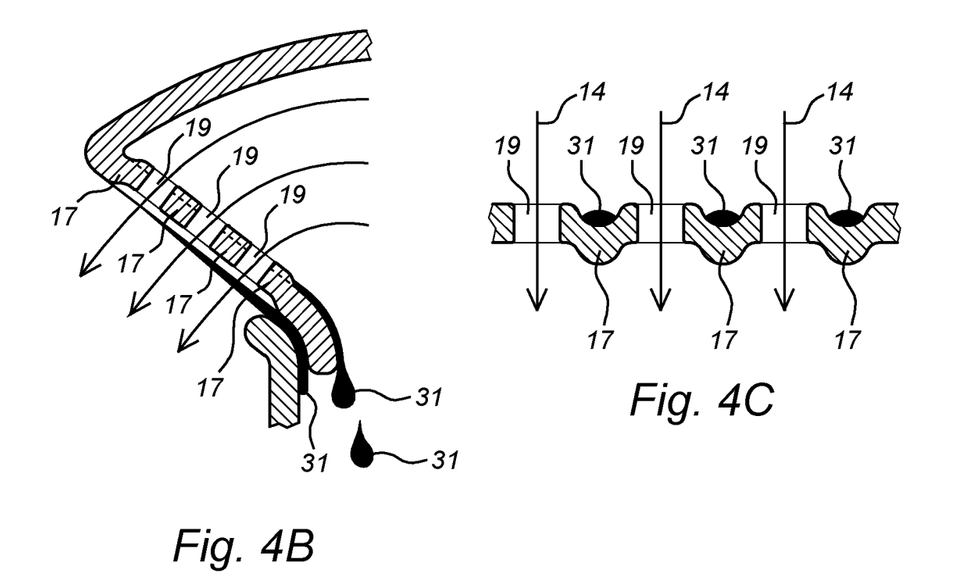
FIG. 4B is a detailed illustration of the vapour passage channels from the cross-section of FIG. 4A.
FIG. 4C is a detailed illustration of the vapour passage channels of FIGS. 4A-B, according to a cross-section in a plane perpendicular to the plane of the FIGS. 4A and 4B.

A detail is shown in FIG. 4B. Condensation 31 is led in a downward direction, along the inclined overhang wall 17, up to the cooking pot 2. Optionally, this overhang wall 17 is thereby provided with a profile with ribs and grooves, as shown in the cross-section according to FIG. 4C. It relates to a detailed view of the vapour passage channels of FIGS. 4A-B, according to a cross-section in a plane that is transverse to the plane of the FIGS. 4A and 4B. The condensation 31 is discharged along the grooves. The vapour passage channels 19, on the other hand, are provided on ribs, and thereby offer a vapour passage 14.

Figure 5:
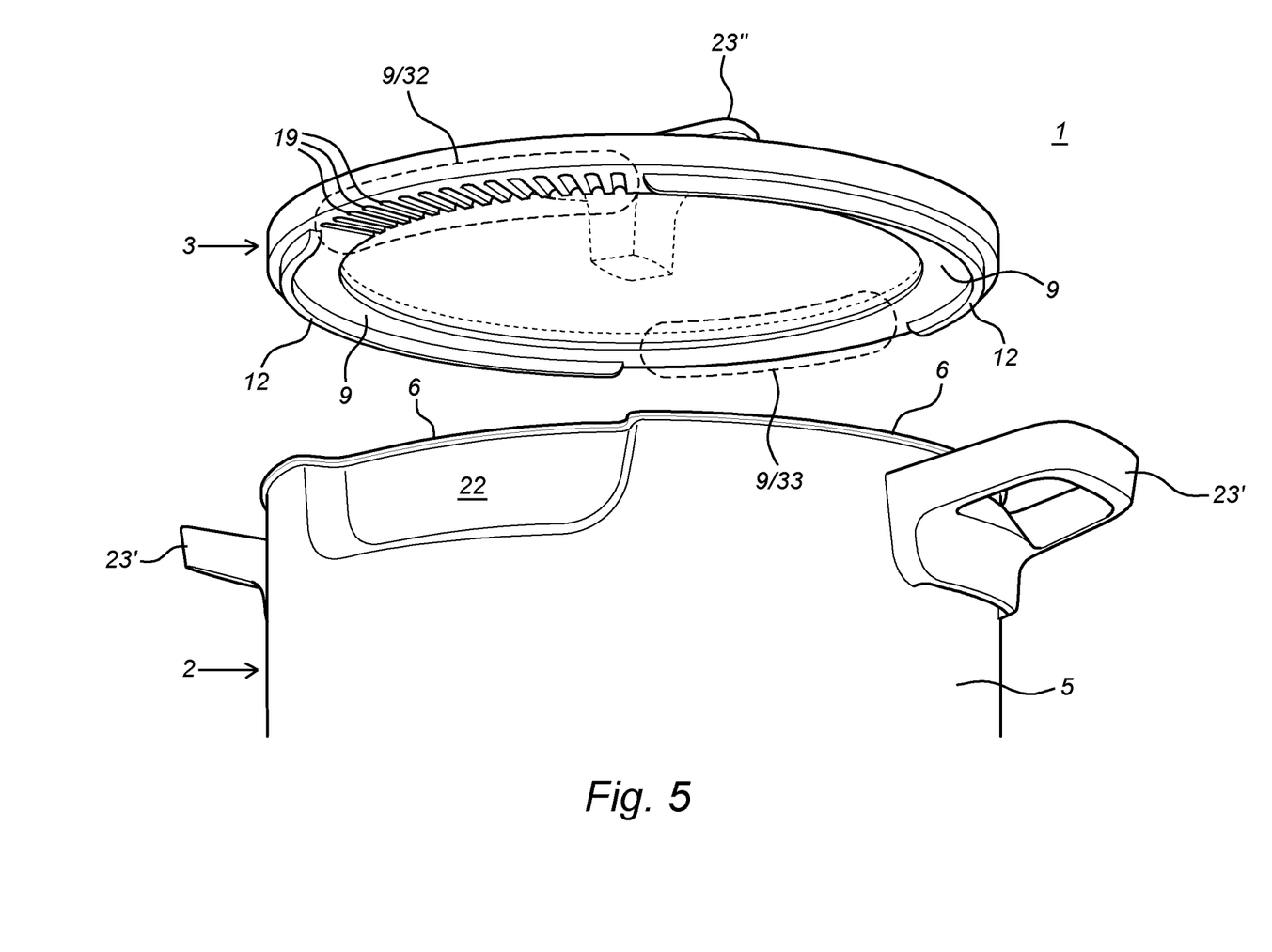
FIG. 5 is a perspective view of a cooking assembly according to another alternative embodiment.

FIG. 5 is a perspective view of a cooking assembly 1 according to another alternative embodiment. The cooking assembly 1 comprises a cooking pot 2 and a pot lid 3. Optionally, it relates to a cooking pot 2, mainly as shown in FIGS. 2-3. The cooking pot 2 can or cannot be provided with a pouring mouth 27 (not shown in the figure).

In closed configuration (not shown), the cooking assembly 1 comprises a vapour passage 14, formed by a plurality of vapour passage channels 19 that are provided underneath and along a span 32.

The vapour passage channels 19 preferably extend to underneath the span 32. The vapour passage channels 19 preferably extend to a niche 22, enclosed by the assembly 1. With such a design, vapour 13 will be discharged in the niche 22, which stimulates a downdraft and/or sidedraft extraction. In closed configuration, the niche 22 is preferably spanned by the span 32. With such a design, the rising of vapour 13 from the niche 22 is avoided. The span 32 itself is enclosed by a lid edge part 9. Thereby, the vapour passage channels 19 are for example formed by radial grooves that have been made in the lid edge part 9, at the level of the span 32. In particular, said vapour passage channels 19 extend between an inside and an outside of the lid edge part 9. Optionally, the vapour passage channels 19 extend from the inside. Optionally, the vapour passage channels 19 extend up to the outside, but preferably, this is not the case. Indeed, in case the vapour passage channels 19 do not extend up to the outside, the sideward escape of vapour 13 from the vapour passage channels 19 is avoided.

The lid edge part 9 is now provided at the bottom side with (interrupted) lid lips 12 with interruption zones in between. The lid lips 12 support a stable position of the pot lid 3 onto the cooking pot 2. The lid lips 12 thereby have a complementary course with the corresponding pot edge 6. At the level of the span 32, the pot lid 2 offers a first, grooved interruption zone. This allows to arrange the span 32 over the niche 22. Thereby, the grooves/vapour passage channels 19 preferably extend between the pot volume 10 and the ambient volume 11, over the pot edge 6. Optionally, the lid edge part 9 still comprises a second, closed span 33. In the shown embodiment, both spans 32, 33 are arranged diametrically with respect to each other. At the level of the closed span 33, the pot lid 3 offers a second, non-grooved (e.g. flat) interruption zone. This allows to arrange the closed span 33 over the niche 22. Thereby, said vapour passage is closed off. Moreover, the user is forced to one of both configurations; in another configuration, a lid lip 12 at the niche 22 hinders each positioning of the pot lid 3 onto the cooking pot 2.

Preferably, the vapour passage channels/grooves 19 do not extend beyond the lid lips 12. Preferably, the lid lips 12 are arranged mainly in a circular (or oval) way, appropriate for positioning of the pot lid 3 onto a cooking pot 2 with a mainly circular (or oval) pot edge 6. Preferably, the vapour passage channels/grooves 19 thereby do not extend up beyond to the described circular (or oval) form. When positioning the closed span 33 over the niche 22, the pot volume 10 is thereby mainly closed off from the ambient volume 11.

THE ENUMERATED ELEMENTS ON THE FIGURES ARE:

1. Assembly
2. Cooking pot
3. Pot lid
4. Pot bottom
5. Pot wall
6. Pot edge
7. Food
8. Cooking unit
9. Lid edge/lid edge part
10. Pot volume
11. Ambient volume
12. Lid lip
13. Vapour
14. Vapour passage
15. Vapour discharge
16. Overhang
17. Overhang wall
18. Lid structure
19. Vapour passage channels
20. Overhung (portion of) ambient volume
21. Central axis
22. Niche
23. Handle
24. Cover plate
25. Marking 26. Azimuthal aperture angle
27. Pouring mouth
28. Pouring stop
29. Recess
30. Closed overhang
31. Condensation
32. Span
33. Closed span It will be understood that the present invention is not limited to the embodiments described above and that some adjustments or changes can be added to the described examples without changing the scope of the enclosed claims.

The invention claimed is:

1. An assembly comprising a cooking pot and a corresponding pot lid for closing off the cooking pot in which the assembly is provided with a vapour passage for removing vapour from the assembly, characterized in that the vapour passage extends in the direction of the cooking pot, wherein the vapour passage is formed by one or more vapour passage channels, and wherein the assembly comprises a niche, in which the vapour passage channels extend into the niche.

2. The assembly according to claim 1, characterized in that the assembly comprises an overhang or a span, in which the vapour passage channels extend to below the overhang or span.

3. The assembly according to claim 2, characterized in that the niche is overhung by said overhang, or is spanned by said span.

4. The assembly according to claim 2, characterized in that the overhang or span is at least partially comprised by the pot lid.

5. The assembly according to claim 4, characterized in that the overhang or span is provided in the pot lid, and the niche is provided in the cooking pot, in which the pot lid comprises a further, closed overhang or span.

6. The assembly according to claim 2, characterized in that the assembly comprises a span, in which the vapour passage channels extend below and along the span, between a pot edge and a lid edge.

7. The assembly according to claim 2, characterized in that the assembly comprises an overhang, in which the vapour passage channels extend through the overhang.

* * * * *